2,710,851

CYANOACYL HYDRAZIDE RESINS

Thomas Boyd, Springfield, Mass., assignor to Monsanto Chemical Company, St. Louis, Mo., a corporation of Delaware No Drawing. Application August 22, 1951, Serial No. 243,183

9 Claims. (Cl. 260—72)

This invention relates to new thermosetting resins. More particularly the invention relates to resins derived from cyanoacyl hydrazides.

One object of this invention is to provide new thermosetting resins.

A further object is to provide thermosettable derivatives of cyanoacyl hydrazides.

These and other objects are attained by condensing a cyanoacyl hydrazide with an aldehyde or ketone and, if desired an alcohol or phenol.

The following examples are given in illustration and are not intended as limitations of the scope of this invention. Where parts are mentioned they are parts by weight.

Example I

Dissolve 100 parts of cyanoacetyl hydrazide in 200 parts of formalin (37% formaldehyde). Heat the solution at 50° C. until all of the water and excess formaldehyde are driven off. The product is a sirupy clear liquid, which may be used as a casting, coating or impregnating composition per se or admixed with conventional coating, casting and impregnating materials. The sirup may be advanced to a hard brittle fusible stage by continued heating at 50° C. This product may be used as a molding powder alone or with fillers, plasticizers, lubricants, pigments, dyes, etc. Both the sirup and the hard brittle resins may be cured to an insoluble, infusible state by heating them at 120° C. to 200° C. for a short time.

If the formalin of the example is replaced by an aqueous solution containing 195 parts of methyl ethyl ketone similar results are obtained.

Example II

Dissolve 100 parts of the sirupy condensation product of Example I in 100 parts of methanol. Heat the solution for about 30 minutes at reflux temperature and atomspheric pressure and then cool the reaction medium. The product is a solution of the methyl ether of the aldehyde condensation product in methanol. The solution may be used as is for coating or impregnating purposes or the methanol may be removed by evaporation to obtain a viscous sirup. This sirup is soluble in organic solvents and may be dissolved therein for impregnating and coating purposes. The ether may be cured to an insoluble infusible state by heating at 120° C. to 200° C. for a short time.

The cyanoacyl hydrazides of this invention have the formula

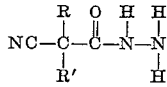

wherein R and R′ may be hydrogen, alkyl, alkenyl, aryl or aralkyl. The hydrazides are prepared by reacting the corresponding cyanoacyl ester with hydrazine in substantially equimolar quantities in an aqueous or alcoholic medium. Examples of the substituents on the cyanoacyl hydrazides are methyl, ethyl, propyl, butyl, isobutyl, lauryl, phenyl, naphthyl, benzyl, phenethyl, allyl, or methallayl, etc. groups.

The cyanoacyl hydrazides may be reacted with aliphatic, aromatic or heterocyclic aldehydes or ketones. The aldehydes or ketones may be saturated or unsaturated and may contain organic substituents such as alkoxy and aryloxy groups. The condensation reaction is best carried out in an aqueous solution or slurry unless it is desired to make the ether products. In the latter case the reaction medium may be the alcohol of the ether constituent. The amount of aldehyde will range from 0.5 to 2 mols per mol of the cyanoacyl hydrazide although an excess of aldehyde may be used with the excess being recovered at the end of the condensation reaction.

The condensation reaction may be carried out at from 20 to 100° C. If it is desired to obtain substantially monomeric condensation products, the reaction is stopped as soon as the water and excess aldehyde or ketone is driven off. The products are sirupy liquids or soft solids. They may be cured to an insoluble infusible state by heating at 120 to 200° C. for a short time. They are soluble in organic solvents.

When it is desired to prepare a solid molding powder, the condensation reaction at 20 to 100° C. is continued until a partial cure is obtained. These products are hard and brittle and may be used in the conventional manner as molding powders. They are cured under the heat and pressure of the molding step.

The condensation products may be further reacted with an alcohol or phenol to produce ether resins which are particularly useful in coating and impregnating applications. This reaction may be carried out simultaneously with the condensation reaction or may be carried out as an added step after the condensation is completed. The etherification reaction may be carried out in solution in an excess of the alcohol or phenol or it may be carried out in solution in inert organic solvents such as aliphatic, aromatic or halogenated hydrocarbons. The alcohols which may be used are aliphatic and aromatic and heterocyclic alcohols which may be saturated or unsaturated. Both the alcohols and phenols may contain substituents such as halogeno, nitro, cyano, amino, etc., groups. The amount of alcohol or phenol used is dependent on the amount of aldehyde or ketone used. In general, from 0.1 to 1.0 mol of alcohol or phenol may be reacted for each mol of aldehyde or ketone. The etherification products are viscous liquids or soft solids which are particularly useful in coating and impregnating compositions. They may be cured to the insoluble infusible state by heating at 120 to 200° C.

No catalysts are necessary to prepare the various resins of this invention. However, acid or alkaline catalysts may be used in the condensation reaction and acid catalysts may be used in the etherification reaction.

It is obvious that many variations may be made in the products of this invention without departing from the spirit and scope thereof as defined in the appended claims.

What is claimed is:

1. A thermosetting resinous condensation product prepared by heating a mixture of a cyanoacyl hydrazide and a compound taken from the group consisting of aldehydes and ketones until substantially all the water of condensation and substantially all of the unreacted compounds present in the reaction mixture are driven off and a relatively anhydrous resin remains, said cyanoacyl hydrazide having the formula

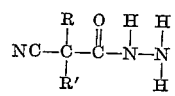

wherein R and R' are taken from the group consisting of hydrogen, alkyl, alkenyl, aryl and aralkyl radicals.

2. A thermosetting resinous condensation product prepared by heating a mixture of cyanoacetyl hydrazide and a compound taken from the group consisting of aldehydes and ketones until substantially all of the water of condensation and substantially all of the unreacted compounds present in the reaction mixture are driven off and a relatively anhydrous resin remains.

3. A thermosetting resinous condensation product prepared by heating a mixture of a cyanoacyl hydrazide and formaldehyde until substantially all of the water of condensation and substantially all of the unreacted compound present in the reaction mixture are driven off and a relatively anhydrous resin remains, said cyanoacyl hydrazide having the formula

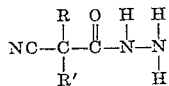

wherein R and R' are taken from the group consisting of hydrogen, alkyl, alkenyl, aryl and aralkyl radicals.

4. A thermosetting resinous condensation product prepared by heating a mixture of cyanoacetyl hydrazide and formaldehyde until substantially all of the water of condensation and substantially all of the unreacted compounds present in the reaction mixture are driven off and a relatively anhydrous resin remains.

5. A thermosetting resinous condensation ether prepared by etherifying with a compound taken from the group consisting of alcohols and phenols, a resinous reaction product obtained by heating a mixture of a cyanoacyl hydrazide and a compound taken from the group consisting of aldehydes and ketones, said cyanoacyl hydrazide having the formula

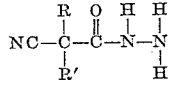

wherein R and R' are taken from the group consisting of hydrogen, alkyl, alkenyl, aryl and aralkyl radicals.

6. A thermosetting resinous condensation ether prepared by etherifying with a compound taken from the group consisting of alcohols and phenols, a resinous reaction product obtained by heating a mixture of cyanoacetyl hydrazide with a compound taken from the group consisting of aldehydes and ketones.

7. A thermosetting resinous condensation ether prepared by etherifying with a compound taken from the group consisting of alcohols and phenols, a resinous reaction product obtained by heating a mixture of a cyanoacyl hydrazide and formaldehyde, said cyanoacyl hydrazide having the formula

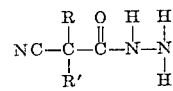

wherein R and R' are taken from the group consisting of hydrogen, alkyl, alkenyl, aryl and aralkyl radicals.

8. A thermosetting resinous condensation ether prepared by etherifying with methanol, a resinous reaction product obtained by heating a mixture of a cyanoacyl hydrazide and a compound taken from the group consisting of aldehydes and ketones, said cyanoacyl hydrazide having the formula

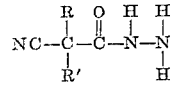

wherein R and R' are taken from the group consisting of hydrogen, alkyl, alkenyl, aryl and aralkyl radicals.

9. A thermosetting resinous condensation ether prepared by etherifying with methanol a resinous reaction product obtained by heating a mixture of cyanoacetyl hydrazide and formaldehyde.

References Cited in the file of this patent

UNITED STATES PATENTS

| | | |
|---|---|---|
| 2,527,476 | Bruylants | Oct. 24, 1950 |
| 2,631,991 | Boyd et al. | Mar. 17, 1953 |

OTHER REFERENCES

Rothenberg: Berichte der Deut. Chem. Gesel., vol. 17 (1894), p. 688.